(12) United States Patent
Care et al.

(10) Patent No.: US 7,252,000 B2
(45) Date of Patent: Aug. 7, 2007

(54) METHOD AND MACHINE FOR ROTOR IMBALANCE DETERMINATION

(75) Inventors: Ian C. D. Care, Derby (GB); Seamus Garvey, Nottingham (GB)

(73) Assignee: Rolls-Royce PLC, London (GB)

( * ) Notice: Subject to any disclaimer, the term of this patent is extended or adjusted under 35 U.S.C. 154(b) by 207 days.

(21) Appl. No.: 11/049,680

(22) Filed: Feb. 4, 2005

(65) Prior Publication Data
US 2005/0188765 A1 Sep. 1, 2005

(30) Foreign Application Priority Data
Feb. 27, 2004 (GB) ................................ 0404380.8

(51) Int. Cl.
*G01M 1/22* (2006.01)
*G05B 21/08* (2006.01)

(52) U.S. Cl. ......................................... 73/462; 700/279
(58) Field of Classification Search .................. 73/460, 73/462, 468, 471, 473, 475, 476, 477; 700/279–280, 700/164, 56–58
See application file for complete search history.

(56) References Cited

U.S. PATENT DOCUMENTS

| 4,419,894 | A | * | 12/1983 | Matumoto | ................ | 73/462 |
|---|---|---|---|---|---|---|
| 4,495,811 | A | | 1/1985 | Müller et al. | | |
| 4,626,147 | A | * | 12/1986 | Nystuen et al. | ............. | 409/133 |
| 4,696,585 | A | * | 9/1987 | Swearingen | ................ | 384/399 |
| 4,750,361 | A | * | 6/1988 | Bandhopadhyay | ........... | 73/462 |
| 5,257,541 | A | | 11/1993 | Trommer et al. | | |
| 5,703,424 | A | * | 12/1997 | Dorman | ..................... | 310/90.5 |
| 6,007,252 | A | * | 12/1999 | Thelen et al. | ............... | 384/535 |
| 6,618,646 | B1 | * | 9/2003 | Dyer | ........................ | 700/279 |

FOREIGN PATENT DOCUMENTS

EP 0 969 247 A3 1/2000

* cited by examiner

*Primary Examiner*—Helen Kwok
(74) *Attorney, Agent, or Firm*—Oliff & Berridge, PLC

(57) ABSTRACT

Correcting unbalance with regard to rotors (11, 101) and shafts is important in order to improve performance of those rotors (11, 101) or shafts within a practical machine or engine. Previously, result orientated iterative balancing of the rotor or shaft has been achieved in which mass has been added or possibly intrusive and distorted adjustments in drag and stiffness presented through bearings or alteration of the rotor (11, 101) itself have been utilised to improve rotor balance performance. In the present invention, a dynamic bearing 13 is utilised in order to provide force components with some components in phase with rotor deflection in order to simulate negative stiffness and/or some force components in phase with rotor velocity in order to simulate negative drag upon the rotor (11, 101). In such circumstances, a more accurate determination of rotor unbalance is achieved to enable known techniques of perturbed boundary condition analysis for balance correction to be implemented more accurately.

13 Claims, 3 Drawing Sheets

METHOD AND MACHINE FOR ROTOR IMBALANCE DETERMINATION

BACKGROUND

The present invention relates to a method and apparatus for rotor unbalance determination and more particularly, but not exclusively, such determination with respect to rotors secured upon shafts used in turbine engines.

Rotating shafts are used in a wide range of machines and engines. In order to avoid overstressing and simply to achieve operational efficiency, it is desirable to provide rotational balance of the rotor. Unfortunately, particularly with regard to turbine engines, these shafts must operate at a number of different rotational speeds and therefore, it is difficult to accurately determine residual unbalance within a rotor independently of rotor spin speed.

SUMMARY

This invention is about provision for balancing rotors which are flexible. By flexible here, we mean that at one or more speeds within its intended operating range deformations of the rotor are likely to account for non-trivial fractions of the absolute rotor deflections at one or more planes. In general, you can separate all rotor movements into two components: rigid-body movements and pure deformations. If the rms rotor deflections due to deformations are, say, less than 1% of the rms deflections due to rigid-body motions, then the rotor would be called rigid. If they were greater than 20% of the rms deflections due to rigid-body motions, then the rotor would be called flexible.

As indicated above, rotating shafts are used in turbine engines.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 194.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 194 to provide additional propulsive thrust. The high, intermediate and low pressure turbines 16, 17 and 18 respectively drive the high and intermediate pressure compressors 14 and 13 and the fan 12 by suitable interconnecting shafts.

A principle objective with any balancing method or machine for use with rotors is to determine what unbalance correction should be applied to the rotor in order to minimise unbalance related vibrations occurring in a machine i.e. turbine engine within which the rotor will be finally installed. It should be understood that merely minimising the unbalance related vibrations upon the rotor in the machine utilised to provide balancing is not the same as providing optimal correction of unbalance in vibrations in an actual operational machine such as a turbine engine. It will be understood that a turbine engine will associate rotors in the form of compressors or turbines with the shaft and these will create unbalance related vibrations themselves in association with other parts of the machine/turbine engine.

Balancing rotors involves the addition or removal or correction of unbalance at selected planes of a rotor in order that the net response of the rotating machine to the unbalance forces on the rotor is improved. It is fallacious to suppose that after the correction, the rotor is perfectly balanced. The correct view is that the distribution of unbalance on the rotor after balance correction is more favourable than it was before. In order to improve the distribution of residual unbalance on a rotor, it is first necessary to obtain some information as to the initial distribution of unbalance. The obvious action is to support the rotor in bearings of some sort, to spin the rotor in those bearings and to measure vibrations resulting from the unbalance.

The above approach to determining rotor unbalance may be sufficiently detailed if a wide range of rotational speeds for the shaft can be investigated and the responses in terms of radial displacements, velocities, accelerations and forces can be measured at a substantial number of locations with sufficient resolution. Unfortunately, it is difficult to achieve the desired detailed accuracy for good resolution. Rotational speed is limited ultimately by the mechanical strength of the rotor before a rupture under centrifugal loading. It will also be understood that it is necessary that the range of speeds for which rotation is tested to be sufficiently wide to encompass several critical speeds for the rotor. Finally, it will be understood that for safety reasons it will be necessary to limit rotational speed such that there is containment should catastrophic rupture occur and the availability of some form of torque at the higher speeds.

With respect to measuring responses, it will be understood that there are significant difficulties. Measurement of forces is possible at bearings where the rotor is supported assuming that the bearing dynamics are such that inertia effects on the bearing or bearing support do not contribute significantly to the forces measured. Measuring displacements of the rotor requires some form of non-contact method otherwise contact would possibly induce drag vibrational effects along with create forces which may substantially distort the rotor unbalance response. In such circumstances, it is typically necessary to provide optical and electrical/electromagnetic methods to measure rotor displacements but these in turn require intrusive adaptation of the rotor through tracks on the rotor and are themselves subjected to spurious signal components referred to as "run out". For these reasons, measurement resolution is limited.

A fundamental limitation is the balancing machine structure in terms of the base supports and this is why different machines give different results. Also installation environment is not accounted for.

There are further obstacles to use of standard "spin-it and measure", methods for balancing a rotor in the form of a need to perform partial balance corrections during the balancing process. In short, where high-speed balancing is to be carried out, the rotor is initially balanced in order that the extent of lateral response at the higher spin speed is not prohibitive, that is to say, the rotor is notionally balanced at lower speeds and rotational speed is iteratively increased through the range.

From the above, it will be understood that there are a number of limitations to both rotational speed and the number and resolution of measurements which can be made.

Principally, in accordance with the present invention, there is provided an apparatus for determining the distribution of unbalance on a rotor which apparatus comprises a base bearing means for the support of the rotor and rotation means for rotating the rotor: the apparatus being characterised by at least some of the bearing means having an adjustable dynamic stiffness. Also, in accordance with the present invention, there is provided an unbalance determining apparatus for a rotor, the apparatus comprising two spaced apart bearings to support a rotor and rotation means to rotate the rotor in use, the apparatus characterised in that there is a dynamic bearing associated with the rotor and whereby the dynamic bearing provides synchronous deflection force components upon the rotor when rotating which are in phase with local rotor deflection and/or velocity force components upon the rotor when rotating which are in phase with local rotor velocity in order that differing boundary conditions are provided for determining unbalance of the rotor by appropriate analysis.

Typically, the deflection force components provide an effective negative stiffness effect upon the rotor as rotated.

Normally, the deflection force components provided by the dynamic bearing are variable. Similarly, the velocity force components provided by the dynamic bearing are variable.

Normally, the apparatus includes phase sensors for determining the periodic rotational variations in parameters indicative of unbalance of the rotor. Normally, the apparatus includes rotation deflection sensors for determining deflection of the rotor upon rotation. Generally, the apparatus includes support bearing force sensors to determine the force applied to each support bearings during rotation of the rotor.

Also in accordance with the present invention, there is provided a method of determining unbalance in a rotor utilising an apparatus as described above wherein a rotor is rotated at a number of different rotational speeds in a range and perturbed boundary condition determination analysis is performed at each rotational speed in order to provide details as to unbalance within the rotor.

Normally, the method will also include means for determining necessary compensation for unbalance determined by the method. (S. D. Garvey, M. I. Friswell, E. J. Williams, A. W. Lees & I. Care. 'Robust Balancing' Proc. IMechE, Pt. C. Vol. 216. pp1117-1130, 2002).

BRIEF DESCRIPTION OF THE DRAWINGS

An embodiment of the present invention will now be described by way of example only with reference to the accompanying drawings in which.

DETAILED DESCRIPTION OF EMBODIMENTS

Figure 1:
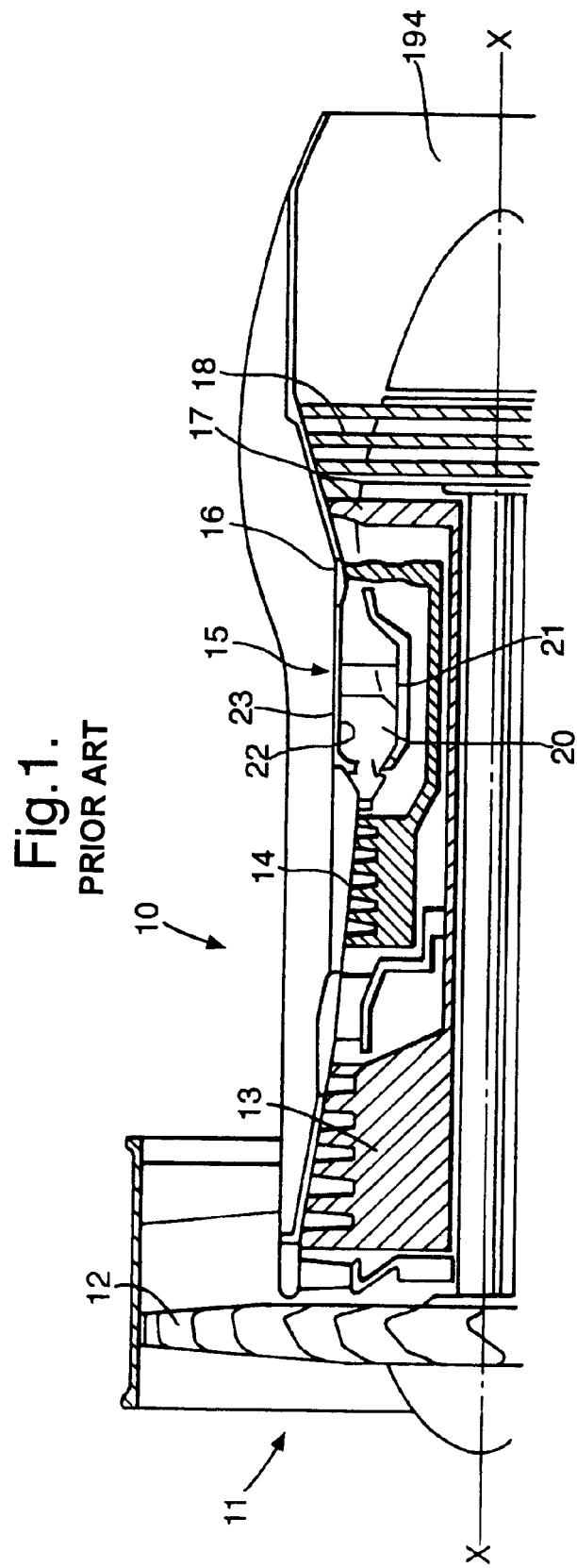
FIG. 1 is a schematic cross-section of a typical gas turbine engine.

The present invention addresses the task of determining the distribution of unbalance on the rotor. Determining how to adjust that distribution of unbalance in an optimal way is an entirely separate process. For balancing of rigid rotors, the two tasks are directly related—even if you know nothing about the properties of the stationary parts of the machine. The term "perturbed boundary condition" was coined in modal analysis to describe the process of testing vibration characteristics of a structure when different dynamic properties are applied to that structure's boundaries. In short, the rationale behind perturbed boundary condition analysis is that with different boundary conditions the structure is forced to deform in different ways and the scope of all deformations which can be explored is therefore greater than it would otherwise be.

In the present situation, the tested structure is a rotor or shaft. Thus, the primary intention with testing such a rotor is to determine the force acting on the rotor rather than the dynamic properties of the rotor itself although this information could be usefully extracted and utilised later.

With regard to determining unbalance within a rotor, typically, the rotor is installed in some kind of balancing machine and spun up to finite spin speed. The rotor is then analysed by measuring variations in a number of parameters in order to provide some information about the distribution of unbalance within the rotor. In such circumstances, the apparatus used for unbalance determination is treated as a whole entity and so achieving different boundary conditions on the rotor corresponds simply to varying some of the dynamic parameters of the machine. In the context of such simple balancing apparatus varying dynamic parameters might mean adding components of mass to the rotor at particular planes, adjusting the stiffness or damping of the rotor itself, or adjusting the stiffness or damping of the bearings or bearing supports.

It will be appreciated there are significant difficulties with regard to associating added mass with a rotor. Apart from the implicit requirement to remove the rotor from the apparatus and in particular its bearings in order to add the mass, it must be assumed for analytical purposes that the added mass itself does not change the state of unbalance of the rotor. It will be understood that this presumption is difficult to justify in practice.

Adjusting stiffness or damping of the rotor without effecting its state of unbalance is theoretically possible by utilising such approaches as shape memory alloys within the rotor but in itself raises numerous practical concerns with regard to distortion of results. In such circumstances, unless provision is provided for ensuring that the stiffness or damping adjustment is retained upon the rotor during operation there are difficulties in ensuring the state of balance of the rotor does not change with removal of the means for adjusting stiffness or damping applied to the rotor.

Adjusting the stiffness or damping of bearings is far more practical and provides the basis for the present invention. In principle, if a rotor is rotated in various flexible bearings or bearing supports then its displacement response to unbalance will be dominated by so called "rigid body" modes of free rotor rotation. If the rotor is then run in very stiff bearings, its displacement response to unbalance will be dominated by the lowest natural mode of so called "pinned" rotor rotation. In this very simple situation, it is clear that rotating the rotor in both the flexible free bearings and the stiff end bearing condition provides increased information upon the distribution of unbalance within the rotor compared with doing either one of these independently.

Previously, some balancing machines have measured forces experienced at the bearings. In such a machine having stiff bearings, the combination of force measurements at each of the two support bearings together with the displacement measurements at the centre of the rotor span provides three independent sources of information data upon the state of unbalance of the rotor when rotating.

The present invention relates to enhancing the acquired data obtained about the distribution of residual unbalance of the rotating rotor without making any modifications to the stiffness or damping properties of the support bearings supporting the rotor as it rotates and without adding mass to the rotor or using a provision for changing the stiffness of the rotor itself.

It will be understood that by changing the stiffness of a bearing/support on a rotor from a small positive value to a larger one typically has the effect that the number of natural modes of the rotor in its support which contribute significantly to the displacement response of the rotor tends to be reduced. In such circumstances, if the only measured parameters acquired are for rotor displacements upon rotation, and if only one condition of bearing/support stiffness is available, then it is substantially better to rotate the rotor on relatively soft bearings/support than upon harder bearings or supports.

If the stiffness of one bearing/support on the rotor is caused to become negative, then the effect will be to increase the number of natural modes of the rotor within its support which contribute significantly to displacement response. In such circumstances, provision of an apparatus in which negative stiffness bearings/supports are used to enrich the information obtained from balance rotation operations on a given rotor is a key feature of the present invention.

Figure 2:
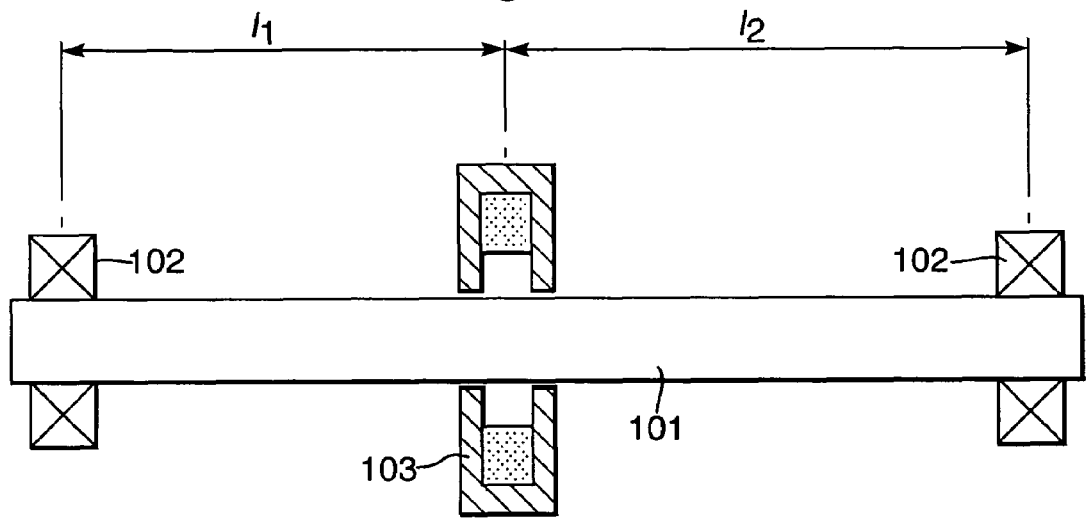
FIG. 2 is a schematic view of a rotor in a balancing machine.

Referring to FIG. 2 providing a schematic illustration of a rotor unbalance determining apparatus in accordance with the present invention. Thus, a rotor 101 is held in support bearings 102 with a dynamic bearing 103 located near the centre of the span between the bearings 102. In use, the apparatus is supported upon support bearings (not shown) but in accordance with the present invention, it is assumed that the stiffness of the supporting structure is absolute or infinite. If it is considered that the stiffness of the support bearings 102 respectively on the left-hand side and right-hand side are k1 and k2, then identifying k3 as representing the static stiffness of the rotor 101 in the sense that k3 units of force are required to cause one unit of force on the rotor 101 at the centreline through the dynamic bearing 103 then transverse motion of the rotor 101 at the centreline of the support bearings 102 is completely prevented, that is to say the support bearings 3 resiliently retain centreline position. In such circumstances, l1 and l2 represent the distances between the centrelines of the support bearings 102 and the centreline of the dynamic bearing 103.

In the above scenario and assuming the absence of any forces from the dynamic bearing 103, then the effective static stiffness of the rotor 101 at the centreline of the dynamic bearing 103 is k4. The value of k4 is given by the equation:

$$\frac{1}{k_4} = \frac{1}{k_3} + \frac{1}{(l_1+l_2)}\left[\frac{l_2}{k_1} + \frac{l_1}{k_2}\right] \quad \text{Equation 1}$$

If we now propose that the dynamic bearing 103 has a negative static stiffness in the order of −k5 and the dynamic bearing 103 as stated is rigidly supported, then it is possible to vary the negative static stiffness k5. If k5 is greater than k4, then the rotor 101 will be unstable and it will be subject to displacement pull-over. If k5 is less than k4 then the rotor 101 will remain stable but some of the critical speeds of the rotor 101 bearing apparatus will be reduced and the suscep-tibility of the rotor 101 to respond to unbalance at low speeds will be greatly increased. As k5 increases from zero, all of the natural frequencies of the rotor 101 upon its bearings/supports will fall in value. The rotor 101 remains stable as long as the lowest natural frequency does not pass through a zero hertz value.

As indicated above, the ultimate objective of any unbalance determining apparatus and method is to determine what unbalance correction should be applied to the rotor to minimise unbalance related vibrations occurring in the machine, and in particular a turbine engine, within which the rotor will be finally installed. Such minimising of the unbalanced related vibrations can be achieved if the uncorrected state of unbalance of the rotor is determined with sufficient detail and given that detail, the optimum unbalance correction can then be both determined and applied to the rotor. Previously, these two tasks were not separated and the state of unbalance of the rotor specified simply in terms of the balancing corrections that have been applied to it in order to minimise unbalance related vibrations. Generally, unbalance of the rotor can be expressed as:

$$U_{R1} = Xp \quad \text{Equation 2}$$

Wherein:

$U_{R1}$ is a vector which may typically have several hundred complex entries in it—each one representing a measure of unbalance (magnitude and phase) at a different plane on the rotor. For the purposes of this section, this can be considered to represent the actual state of unbalance on the rotor. Appendix A provides further clarification on this.

X is a real value matrix having the same number of rows as there are entries in $U_{R1}$ and a small number of columns (typically 3-5).

p is a vector having a small number of complex entries in it (typically 3-5). The number of entries in p must be identical to the number of columns in $U_{R1}$.

By knowledge of the sensitivity of each of the measured synchronous vibration components to the unbalance of the rotor at various planes of that rotor and also as a function of the rotor spin speed and other controllable parameters, especially negative stiffness/damping, it is possible to determine p from a set of measured data through appropriate analysis.

The present invention provides apparatus for detecting the distribution of unbalance on a rotating rotor by obtaining vibration response data from the spinning rotor at one or more rotational speeds and subject to a number of different sets of boundary conditions on that rotor. This vibration response data typically includes measurements of displacement of the rotor, velocity of the rotor, acceleration of the rotor and force incident upon support bearings for the rotor. These different boundary conditions are achieved by adjusting the dynamic characteristics of a dynamic bearing or bearings for support for the rotor.

In accordance with the present invention, a rotor is appropriately supported by a number of bearings with at least one of these bearings a dynamic bearing in accordance with the present invention. The definition of a dynamic bearing is such that it has provision for exerting synchronous forcing on the rotor having a number of distinct force components. Some of these force components are in phase with local rotor deflection in order to create a negative stiffness effect. Alternatively, or additionally, some of these force components are in phase with local rotor velocity thereby producing a negative damping effect. In such circumstances, dynamic variation in accordance with the present invention is capable of exerting these force components at rotational speeds in the arrangement expected to be used for the rotor unbalance determination analysis required for appropriate subsequent correction.

The dynamic bearing may be passive in the sense that it is embodied without the need for rotor position or velocity sensing or a requirement for active feedback control of the dynamic bearing in response to sensed rotor unbalance.

Normally, a dynamic bearing in accordance with the present invention will be adjustable through setting of one or more parameters whereby the degree of negative stiffness and/or negative damping provided may be caused to move positionally about the rotor position within the apparatus.

Additionally, the present apparatus may include provision for perturbing the rotor in order to stimulate natural frequencies and characteristic frequency decay rates within the apparatus including the rotor. It will be appreciated that these natural frequencies and characteristic frequency decay rates will be indicative of rotor unbalance as well as operational performance.

Dynamic bearings in accordance with the present invention can be formed by a number of techniques. The dynamic bearings might be fluidic bearings (hydrostatic/hydrodynamic), or they might be magnetic. They might even be mechanical but this is not usually a preferred strategy.

The dynamic bearings can be "semi-active" or "active". Active bearings involve sensors and a real-time controller which has update rates of many updates per cycle of the rotor (at maximum rotor spin speed). By "semi-active" bearings, we means that the force exerted between rotor and stator is determined only by relative position of rotor and stator at the bearing location and by some slowly-varying parameters like excitation current in the case of a magnetic bearing and like supply pressure in the case of the fluidic bearings.

With magnetic bearings, it will be understood that rotors need to incorporate a significant proportion of magnetic material to allow a magnetic source to induce magnetomotive forces and magnetic flux path projection externally towards the rotor such that lines of magnetic flux have at least some radial component which passes through the surface of the rotor. In such circumstances, if the rotor deflects on rotation in one direction, there is a resulting reduction in the air gap in that direction between the rotor and the magnetic bearing which in turn causes a redistribution of magnetic flux. This re-distribution of magnetic flux will then result in a net transverse force exerted on the rotor by the dynamic bearing in the same direction and same sense as the rotor displacement during rotation.

A hydraulic or fluidic dynamic bearing in accordance with the present invention, will be provided through sources of air or other suitable gas/fluid and with a containment of about the dynamic bearing section through which the rotor extends. Thus, by continuously charging the containment with gas or fluid it will be understood the only or primary escape path for the gas out of the containment is through a cylindrical annulus between the rotor surface and nearby surfaces of the gas containment. In such circumstances, when there is displacement by the rotor during rotation, there is circumferentially different gas flow around that cylindrical annulus and therefore, pressurisation force exerted.

Figure 3:
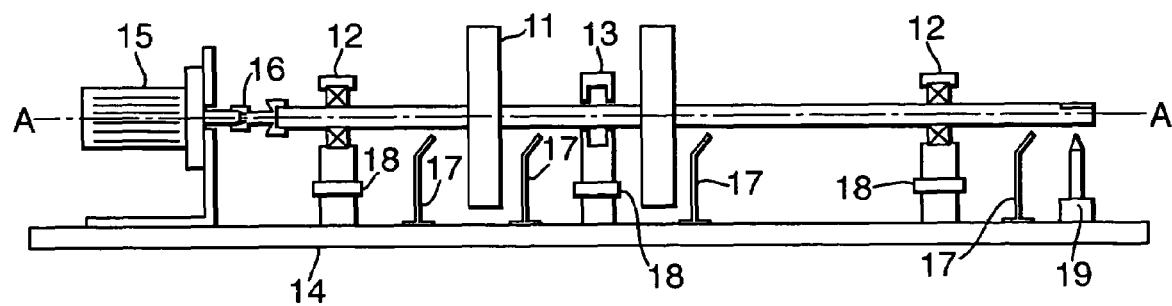
FIG. 3 is a schematic view of an unbalance determining apparatus in accordance with the present invention.

Referring to FIG. 3 which provides a schematic view of an apparatus for determining rotor unbalance. Thus, a rotor 11 is supported by support bearings 12 with a dynamic bearing 13 located intermediately support between the bearings 12. The support bearings 12 as well as the dynamic bearing 13 are stably presented upon a base 14 for resilient positioning. The rotor 11 is rotated through a flexible coupling 16 by rotating means 15 to provide such rotation normally in the form of a motor. Phase sensors 17 are specifically positioned in order to detect cyclical vibration changes as the rotor 11 is rotated by the rotating means 15. Deflection sensors 18 are located within the bearings 12, 13 in order to determine deflections in both transverse directions at various planes normal to the major axis A-A of the rotor 11 and therefore axis of rotation. A force measuring sensor 19 provides information as to the forces transmitted to the support bearings 12.

The base 14 provides a common platform for all bearings 12, 13 as well as the motor 15 which provides for rotation of the rotor 11. It will also be understood that typically, the sensors 17 and 19 are also supported upon the base 4. The deflection sensors 18 are incorporated within the support stands holding the bearings 12, 13 in order to provide information as to deflection of the rotor 11.

The flexible coupling 16 provides isolation of the rotor 11 from lateral vibrations, that is say along the axis rotation A-A derived from the motor 15 operating to provide rotation of the rotor.

In order to ensure that the rotor 11 never experiences significant differences in the total support characteristics in any two orthogonal planes perpendicular to the axis rotation (A-A), the base 14 is designed to be resilient and normally is heavy and stiff. In such circumstances, the bearing supports for the bearings 12, 13 are appropriately presented for determination of rotational unbalance.

A typical process or method for determining unbalance within the rotor 11 comprises the steps of rotating or spinning the rotor 11 in a number of different combinations of rotational speed and negative stiffness/negative drag. Normally, the process or method begins with a condition of zero negative stiffness achieved through a dynamic bearing 13 acting upon the rotor 11. In each combination of rotation speed and negative stiffness relative to a shaft reference phaser the synchronous force vibrational components are determined and recorded for that combination and condition.

For each different negative stiffness provided by the dynamic bearing 13, it will be understood that the highest rotational speed utilised may be determined by the maximum allowed speed of the rotor 11 constrained by possible rupture of that rotor 11 or by vibrational levels on the rotor 11 becoming excessive as detected through the phase detector 17. All the measured synchronous vibrational components are collated and utilising within an appropriate analytical technique (see Appendix A) in order to compute actual entries in the vector p present in the rotor (see above Equation 2).

As described above, the dynamic bearing 13 is a passive magnetic bearing inherently providing negative stiffness to the rotor 11. FIG. 3 is a schematic cross-section illustrating such a magnetic dynamic bearing 13 in accordance with the present invention. The bearing 13 substantially comprises laminated disk shaped end plates 20 with solid iron cylindrical yokes 21 and an energising coil 22. The end plates 20 have holes 23 to accommodate the rotor (not shown) to be tested. A clearance gap is provided between the inner diameter of these holes 23 and the rotor diameter when located within the dynamic bearing 13. This clearance gap is large enough such that the maximum expected rotor vibrations will only take up a non-intrusive fraction of the available clearance gap. Typically, the clearance gap will be established such that these vibrations will be no more around 40% of the clearance gap. The end plates 20 are laminated in order that no significant electrical eddy current losses arise in these end plates 20 as a rotor (not shown) rotates within the hole 23. It will be understood that the coils 22 generate a magnetic flux field which extends radially across the clearance gap.

In operation, if the rotating rotor undergoes perfectly circular forward rotational orbits at the centre of the dynamic bearing 13 that is to say the centre of the rotor at this plane coincides in the same direction as shaft rotation, then no electrical eddy currents will be induced in the rotor and every point on the rotor surface experiences the same magnetic conditions at every instance in the rotational cycle.

Magnetic flux passes radially inwards through one of the end plates 20 and passes across the clearance gap to become incident upon the rotor. As that magnetic flux extends axially along the rotor to the location of the other end plate 20 where it crosses the clearance gap and subsequently travels radially outwards through the end plate 20. This magnetic circuit is completed by the cylindrical yoke 11 about the dynamic bearing 13.

It will be appreciated that the strength of the magnetic field and magnetic flux pattern is significantly determined by the coil 22. Similarly, within the magnetic circuit created by the end plates 20, cylindrical yoke 21 and interaction with the rotor (not shown) the magnetic flux strength is mathematically determinable but inherently variable dependent upon deflection of the rotor from its central position within the hole 23. Thus, as indicated above, if the rotor is perfectly centrally located and rotating, then the flux pattern will be equalised and no eddy currents will be induced. Clearly, such a perfect rotor is not normally presented.

Figure 4:
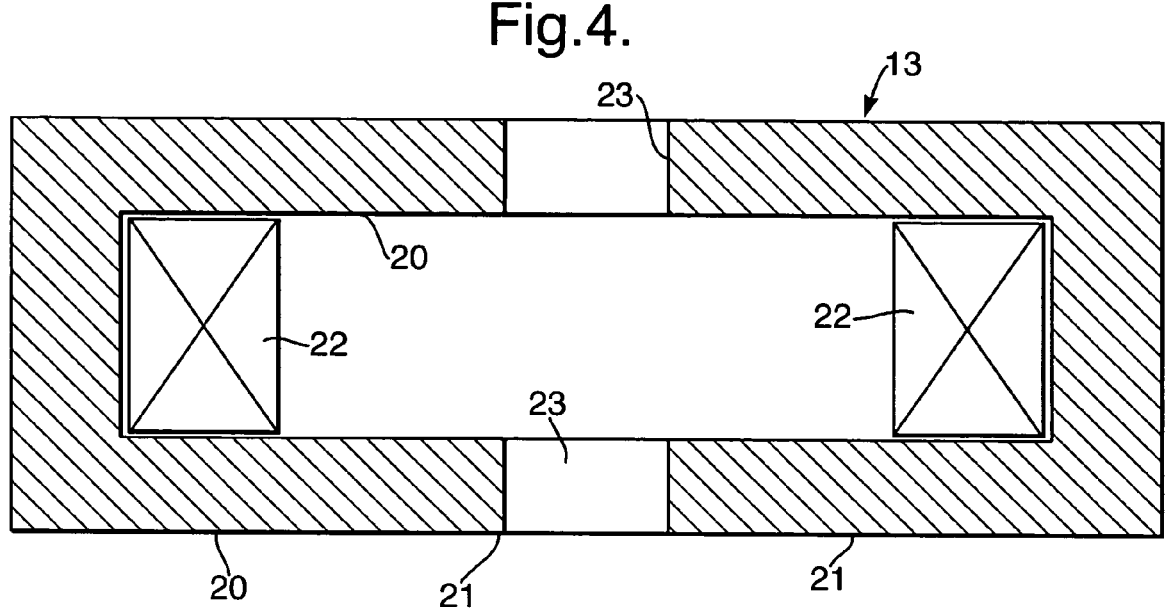
FIG. 4 is a schematic cross-section of a magnetic dynamic bearing in accordance with the present invention; and, FIG. 5 provides schematic cross-sections illustrating magnetic flux bunching due to rotor unbalance deflection.
Figure 5A:
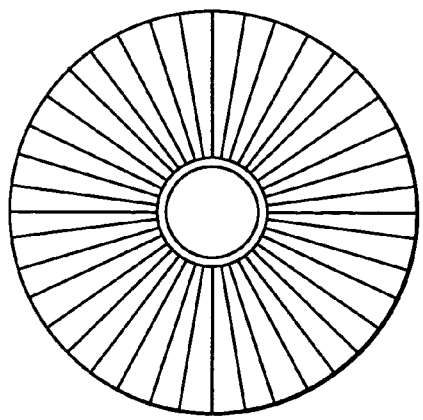
Figure 5B:
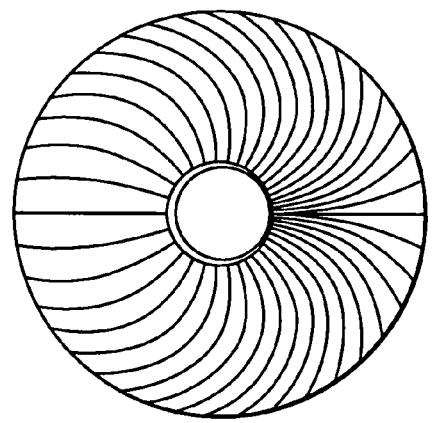

FIG. 4 illustrates respectively in FIG. 4a an exaggerated magnetic flux pattern where the rotor is performing perfectly circular rotational orbits within the dynamic bearing and in FIG. 4b, where that rotor is displaced. As can be seen in FIG. 4b, the magnetic flux pattern is distorted such that a force acts in the same direction as the rotor deflection. In such circumstances, this force created by magnetic flux distortion acts precisely as a negative stiffness. The value of this negative stiffness can be deduced mathematically.

As indicated above, as an alternative to using a magnetic bearing, a dynamic bearing in accordance with the present invention may be formed through a fluidic/hydraulic design. In such circumstances, instead of providing coil windings through which an electrical current is presented in order to create a magnetic flux pattern, the dynamic bearing includes containment for pumped air or other fluid. In such circumstances, air is forced through a cylindrical annulus between the rotor and the internal containment surface of the dynamic bearing and as such, deflections of the rotor due to unbalance and so vibration will create pressure differentials which cause negative stiffness.

In order to create the different negative stiffness values required for different combinations of rotational speed and negative stiffness utilised for unbalance determination analysis, it will be understood that either the electrical current through the coils 22 or pump pressure provided through a fluidic pneumatic dynamic bearing will be increased or decreased as required to adjust the negative stiffness value used in combination with different rotational speeds.

The present invention allows multi-plane rotor balancing without "high speed balancing" in terms of adjusting components of mass upon the rotor, adjusting stiffness or damping of the rotor or adjusting stiffness or dampness of the bearings. In such circumstances, the degree of balancing of the rotor is greatly improved and only one unbalanced determining analysis and one balanced correction operation is required. It will also be understood that a certain performance tolerance level in terms of analysis sensitivity may be defined and then the unbalanced determination to balance correction performed to meet that tolerance level. Thus, the degree of unbalanced determination to balance correction performance sensitivity and accuracy is related to the necessary accuracy in an operational engine or machine for that rotor or shaft. In short, greater accuracy can be performed when required for those rotors or shafts that need such accuracy but not for less critical shaft performance objectives.

As indicated above, the present apparatus and method for determining rotational unbalance within a rotor provides an initial analysis of that rotor and then allows specific alteration of that rotor in terms of attaching mass at particular planes or positions upon the rotor or other adaptation techniques in order to minimise unbalance vibration in the eventual machine or engine to which the rotor and/or shaft will be incorporated. Clearly, such situations require knowledge of the eventual machine or engine to which the rotor or shaft will be incorporated in order to deduce the necessary rotor or shaft performance for that actual machine or engine. Nevertheless, once the rotor or shaft has its unbalance determined then appropriate adjustment to the necessary rotor configuration for use in the machine or engine is made.

By utilisation of a dynamic bearing 13 in accordance with the present invention, it is possible to present differing boundary conditions to the rotor for a full rotational speed/stiffness analysis without demounting the rotor or shaft in order to add mass or performing potentially analytical result distorting actions with regard to adjusting stiffness or damping of the rotor itself or adjusting stiffness or damping of the support bearings 12. In effect, the dynamic bearing 13 provides force components which are in phase with local rotational deflection inducing a negative stiffness effect and/or force components which are in phase with local rotor velocity and therefore, producing a negative damping effect upon the rotor. The support bearings 12 continue to operate as normal. These force components are generated as indicated above through magnetic flux interaction or through fluidic flow within a containment circular annulus. In such circumstances, the dynamic bearing 13 in accordance with the present invention is non-intrusive in terms of potential distortion to the true unbalance vibration analytical response and is independent of the rotor support provided by the support bearings 12. In such circumstances, the present invention through the method and apparatus provides a more accurate determination of unbalanced vibration within the rotor and therefore, allows a more accurate correction to that unbalance in order to minimise losses within a practical engine or machine incorporating the rotor or shaft. It will be appreciated that once the unbalance vibration response is determined, usual techniques for correction of that unbalance will be utilised in accordance with the present invention. The present invention relates to determining unbalance within the rotor more accurately to allow such correction techniques to be more appropriately implemented.

In some cases, the dynamic bearings act to drop the critical speeds of the rotor in the balancing provision—thereby making the rotor take up significant response to some components of unbalance which would otherwise not be seen significantly.

In cases where the rotor being balanced is intended ultimately to be suspended on at least one magnetic bearing, the balancing provision described in this invention may have fewer than two "support bearings" since support could be achieved on the active magnetic bearings.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An unbalance determining apparatus for a rotor, the apparatus comprising two spaced apart bearings to support a rotor and rotation means to rotate the rotor in use, the apparatus characterised in that there is a dynamic bearing associated with the rotor and whereby the dynamic bearing provides synchronous deflection force components upon the rotor when rotating which are in phase with local rotor deflection and/or velocity force components upon the rotor when rotating which are in phase with local rotor velocity in order that differing boundary conditions are provided for determining unbalance of the rotor by appropriate analysis.

2. An apparatus as claimed in claim 1, wherein the deflection force components provide an effective negative stiffness effect upon the rotor as rotated.

3. An apparatus as claimed in claim 1, wherein the velocity force components provide a negative damping effect upon the rotor as rotated.

4. An apparatus as claimed in claim 1, wherein the deflection force components provided by the dynamic bearing are variable.

5. An apparatus as claimed in claim 1, wherein the velocity force components provided by the dynamic bearing are variable.

6. An apparatus as claimed in claim 1, wherein the apparatus includes means for perturbing rotation of the rotor to induce natural frequency and/or characteristic frequency decay rates indicative of unbalance within the rotor.

7. An apparatus as claimed in claim 1, wherein the apparatus includes phase sensors for determining the periodic rotational variations in parameters indicative of unbalance of the rotor.

8. An apparatus as claimed in claim 1, wherein the apparatus includes rotation deflection sensors for determining deflection of the rotor upon rotation.

9. An apparatus as claimed in claim 1, wherein the apparatus includes support bearing force sensors to determine the force applied to each support bearing during rotation of the rotor.

10. A method of determining unbalance in a rotor utilizing an apparatus as claimed in claim 1, wherein a rotor is rotated at a number of different rotational speeds in a range and perturbed boundary condition determination analysis is performed at each rotational speed in order to provide details as to unbalance within the rotor.

11. A method as claimed in claim 10, wherein the method also includes means for determining necessary compensation for unbalance in the rotor determined by the method.

12. A method of determining unbalance in a rotor utilizing an apparatus as claimed in claim 1, wherein at least one of the dynamic bearings has an adjustable dynamic stiffness.

13. A method as claimed in claim 12, wherein a rotor is rotated at a number of different bearing stiffnesses in a range and a perturbed boundary condition determination analysis is performed at each bearing stiffness in order to provide details as to unbalance within the rotor.

* * * * *